C. F. ADAMSON.
PORTABLE VULCANIZING DEVICE FOR TIRES.
APPLICATION FILED OCT. 25, 1911.
1,057,911.
Patented Apr. 1, 1913.
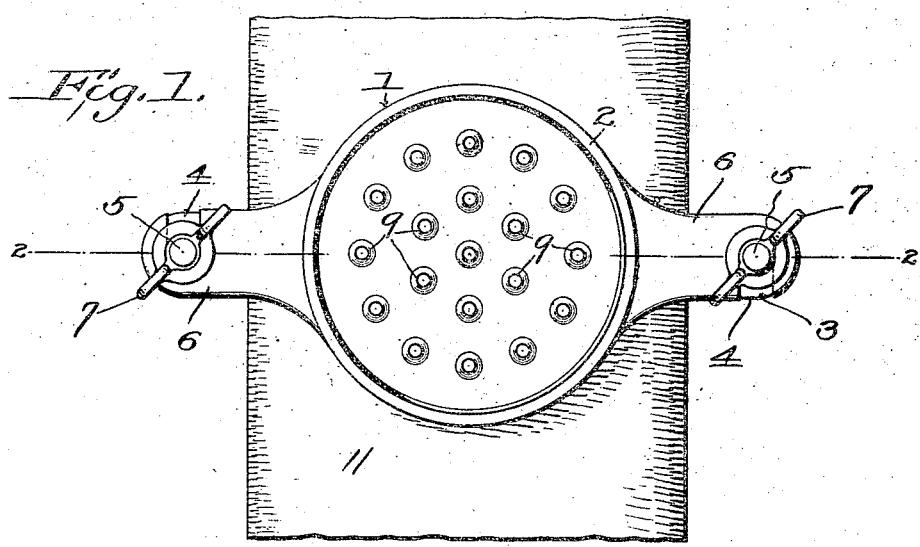
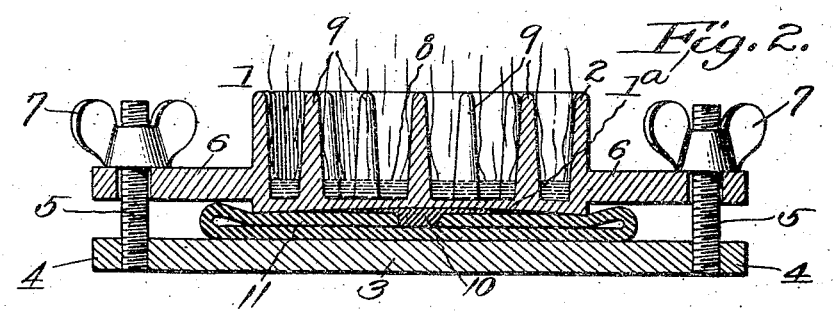
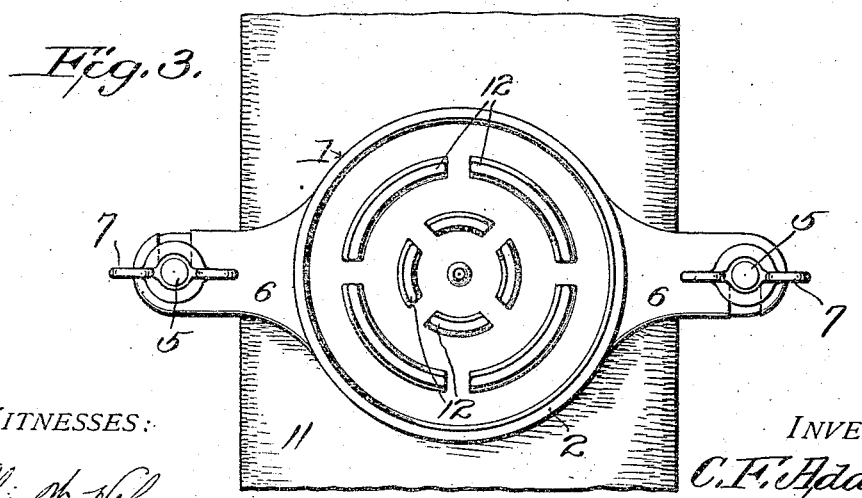
WITNESSES:
Oliver N. Holmes
E. P. Everett
INVENTOR
C. F. Adamson
BY
H. S. Hill
Attorney

UNITED STATES PATENT OFFICE.

CECIL F. ADAMSON, OF AKRON, OHIO.

PORTABLE VULCANIZING DEVICE FOR TIRES.

1,057,911.  Specification of Letters Patent.  Patented Apr. 1, 1913.

Application filed October 25, 1911. Serial No. 656,604.

*To all whom it may concern:*

Be it known that I, CECIL F. ADAMSON, citizen of the United States, residing at Akron, in the county of Summit and State of Ohio, have invented certain new and useful Improvements in Portable Vulcanizing Devices for Tires, of which the following is a specification.

The present invention relates in general to devices for vulcanizing rubber, and more particularly to that type of vulcanizing devices which are adapted to be employed for the repairing of tires or the like.

Among the objects of the invention is to provide a vulcanizing device which is simple and inexpensive in its construction, which is light and compact in its design and can be readily carried from place to place, which can be easily and quickly applied to the member to be vulcanized, and which will operate in a quick and effective manner to vulcanize the rubber to which it is applied.

A further object of the invention is to provide a vulcanizing device which embodies novel features of construction whereby the use of a steam or water jacket is eliminated and the vulcanizing member is heated directly from the flame, the temperature of the vulcanizing member being automatically controlled without the use of any special or complicated mechanism.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a vulcanizing device constructed in accordance with the invention. Fig. 2 is a longitudinal vertical sectional view through the same on the line 2—2 of Fig. 1, and Fig. 3 is a top plan view showing a modified construction of the vulcanizing device.

Corresponding and like parts are referred to in the following description and indicated in all the views of the drawing by the same reference characters.

Specifically describing the embodiment of the invention illustrated by Figs. 1 and 2 of the drawing, the numeral 1 designates a vulcanizing plate which may be of any desired shape and size and is designed to have one face thereof applied to the material to be vulcanized. In the present instance the lower surface of the plate constitutes the vulcanizing surface and is slightly concaved, as indicated at $1^a$. An annular or continuous flange 2 projects upwardly from the plate 1 so as to form a receptacle adapted to receive some combustible fluid such as gasolene or alcohol. Any suitable means may be employed for holding the vulcanizing plate against the material to be vulcanized, and in the present instance this result is accomplished by means of a clamping plate 3 which coöperates with the vulcanizing plate or member to grip the material to be vulcanized. The clamping plate 3 is illustrated as provided at opposite sides thereof with ears 4 which carry clamping screws 5, the said clamping screws being adapted to be engaged by hooked ears 6 which project from opposite sides of the vulcanizing member or plate 1. Thumb nuts 7 are applied to the clamping screws 5 and constitute a means for drawing the clamping plate against the vulcanizing member so as to firmly grip a rubber tire or like object placed between the same.

In order to heat the vulcanizing member or plate 1, a suitable quantity of some combustible liquid is placed in the receptacle, as indicated at 8 in Fig. 2, and the surface of the combustible fluid ignited. It has been found that the desired temperature at which the vulcanizing member 1 should be retained in order to effectively vulcanize the rubber is substantially the same as the boiling point of the gasolene or like combustible fluid which is placed in the receptacle. The combustible fluid 8 rests upon the vulcanizing plate and is in direct contact therewith at a point opposite the vulcanizing surface, so that the combustible fluid and vulcanizing plate are simultaneously heated and have approximately the same temperature. It will also be observed that the combustible fluid is interposed between the flame or combustion and the vulcanizing plate so as to form a protecting agent and prevent the vulcanizing plate from being overheated by the flame.

It has been found desirable to provide some means for conducting the heat from the flame above the combustible fluid down into the combustible fluid and vulcanizing member. In Figs. 1 and 2 of the drawing the vulcanizing member or plate 1 is shown as provided with a series of posts 9 which project upwardly through and above the combustible fluid 8. The flame caused by the combustion of the gases rising from the combustible fluid acts upon the upper ends of these posts 9, the said posts serving to conduct the heat downwardly into the vulcanizing plate and combustible fluid.

Assuming that it is desired to apply a patch to the inner tube of a pneumatic tire, a piece of suitably prepared rubber 10 would be applied to the defective portion of the tube 11 and the said members clamped between the clamping plate 3 and the vulcanizing member or plate 1. A suitable quantity of combustible fluid 8 would then be placed in the receptacle and ignited. The flame caused by the combustion of the gases rising from the combustible fluid would act directly upon the posts 9 and heat would be conducted by the posts down into the combustible fluid and the vulcanizing plate. As the temperature of the vulcanizing plate and combustible fluid rises, the rapidity with which the gas is given off from the surface of the combustible fluid increases so that the zone of combustion rises within the receptacle. This rising of the flame is due to the fact that the rapid generation of the gas prevents the air from mixing therewith in the necessary proportions to produce combustion until after the gas has risen to a greater height above the surface of the fluid than would be necessary where the fluid was at a lower temperature and the generation of gas less rapid. When the temperature of the vulcanizing plate reaches the maximum point which is desired for vulcanizing purposes, the generation of gas at the surface of the combustible fluid will have become so rapid as to force the flame entirely up to the top of the flange 2 and the posts 9. The flame then becomes ineffective for the purpose of heating the posts or receptacle, and the temperature of the vulcanizing plate and combustible fluid will gradually lower until the flame again drops within the receptacle and becomes effective. The height of the flame above the surface of the fluid and the consequent effectiveness of the flame as a heating agent is thus regulated by the temperature of the combustible fluid so as to automatically control the temperature of the vulcanizing member or plate 1 and prevent the same from becoming either over or under heated during the vulcanizing operation. This operation will continue until the combustible fluid 8 has been entirely consumed, and it has been found that the vulcanizing effect will continue for a short period after the flame has extinguished, owing to the heat which is retained by the vulcanizing member. At the expiration of the proper time required for vulcanization the vulcanizing member is removed, the process being completed. It is also possible to place a predetermined quantity of the combustible fluid within the receptacle so that the vulcanization of the rubber will then have been completed by the time the fluid has been consumed, at which time the vulcanizing member would be removed from the tire.

A slight modification is shown in Fig. 3 in which a series of segmental ribs 12 arranged in concentric annular series are substituted for the posts 9 previously described. The effect of the flame upon these ribs 12 is identical with that previously described in connection with the posts 9, it being merely desirable to provide some heat conducting mediums for conveying the heat from the zone of combustion above the combustible fluid down into both the combustible fluid and the vulcanizing member.

Having thus described the invention, what I claim as new and desire to secure by Letters Patent, is:—

1. A vulcanizing device including a vulcanizing member constructed to retain a combustible fluid, the said combustible fluid being in contact with the vulcanizing member whereby the fluid and vulcanizing member are simultaneously heated by the combustion of the fluid.

2. A vulcanizing device including a vulcanizing member constructed to retain a combustible fluid upon and in contact with its upper surface, the lower surface of the vulcanizing member being adapted to be applied to the material to be vulcanized.

3. A vulcanizing device including a vulcanizing member constructed to retain a combustible fluid upon and in contact therewith, and means for conducting heat from the combustion of said fluid to the said vulcanizing member.

4. A vulcanizing device including a vulcanizing member constructed to retain a combustible fluid upon and in contact with its surface, and means for conducting heat from the combustion of said fluid into said member and combustible fluid which are heated simultaneously, the quantity of heat conducted to said member and combustible fluid being automatically controlled by the temperature of the combustible fluid.

5. A vulcanizing device including a receptacle adapted to contain a combustible fluid, the bottom of the receptacle constituting a vulcanizing member, and means for conducting heat from the combustion of the gas given off by the heated combustible fluid into the combustible fluid and vulcanizing member, the flame of combustion being raised and lowered in the receptacle according to the temperature and consequent volume of gas given off by the combustible fluid so as to automatically control the temperature of the vulcanizing member.

6. A vulcanizing device including a vulcanizing plate having a lower face adapted to be applied to the material to be vulcanized and constructed to retain a combustible fluid upon and in contact with its upper surcanizing plate having a lower face adapted opposite the vulcanizing surface so as to form a protecting agent between the flame at the top of the combustible fluid and the vulcanizing plate.

7. A vulcanizing device including a vulcanizing plate having a lower face adapted to be applied to the material to be vulcanized, a continuous flange projecting from the plate so as to form a receptacle adapted to receive a combustible fluid, and a heat conducting projection extending from the vulcanizing plate through and above the combustible fluid.

8. A vulcanizing device including a vulcanizing plate having a lower face adapted to be applied to the material to be vulcanized, a continuous flange projecting from the plate so as to form a receptacle adapted to receive a combustible fluid, and a heat conducting projection extending from the vulcanizing plate through and above the combustible fluid, the before mentioned flange projecting above the surface of the combustible fluid so as to confine the gases given off by the same and cause the flame to rise and fall within the receptacle and thereby automatically control the temperature of the vulcanizing plate.

9. A vulcanizing device including a vulcanizing plate having a lower face adapted to be applied to the material to be vulcanized, a continuous flange projecting from the plate so as to form a receptacle adapted to receive a combustible fluid, and a series of heat conducting posts projecting from the vulcanizing plate through and above the combustible fluid.

In testimony whereof I affix my signature in presence of two witnesses.

CECIL F. ADAMSON.

Witnesses:
H. S. HILL,
H. C. ROBB.

Copies of this patent may be obtained for five cents each, by addressing the "Commissioner of Patents, Washington, D. C."